United States Patent [19]
Isfort et al.

[11] 3,922,210
[45] Nov. 25, 1975

[54] PROCESS OF AVOIDING MERCURY EMISSION FROM MERCURY-USING PLANTS

[75] Inventors: Heinz Isfort; Hans-Peter Ilgner, both of Dortmund, Germany

[73] Assignee: Friedrich Uhde GmbH, Dortmund, Germany

[22] Filed: Oct. 3, 1973

[21] Appl. No.: 403,113

Related U.S. Application Data
[63] Continuation-in-part of Ser. No. 176,866, Sept. 1, 1971, abandoned.

[52] U.S. Cl. .................... 204/99; 204/128; 203/11
[51] Int. Cl.² ........................................ C25B 1/36
[58] Field of Search .............. 204/99, 128; 75/121; 203/10–11; 423/101

[56] References Cited
UNITED STATES PATENTS

| | | | |
|---|---|---|---|
| 2,796,120 | 6/1957 | Lockman et al. | 203/10 |
| 3,085,859 | 4/1963 | Scholten et al. | 423/101 |
| 3,716,458 | 2/1973 | Greenfield et al. | 203/11 |

OTHER PUBLICATIONS
General Chemistry by H. H. Sisler et al., 1949, p. 244.

*Primary Examiner*—R. L. Andrews
*Attorney, Agent, or Firm*—Malcolm W. Fraser, Esq.

[57] ABSTRACT

Eliminating emission of mercury in an alkaline chloride electrolysis plant, for example, is achieved by converting pre-purified waste water to flushing water through vacuum distillation. Hot brine from the electrolysis plant serves as a heat carrier for the vacuum distillation step.

1 Claim, 1 Drawing Figure

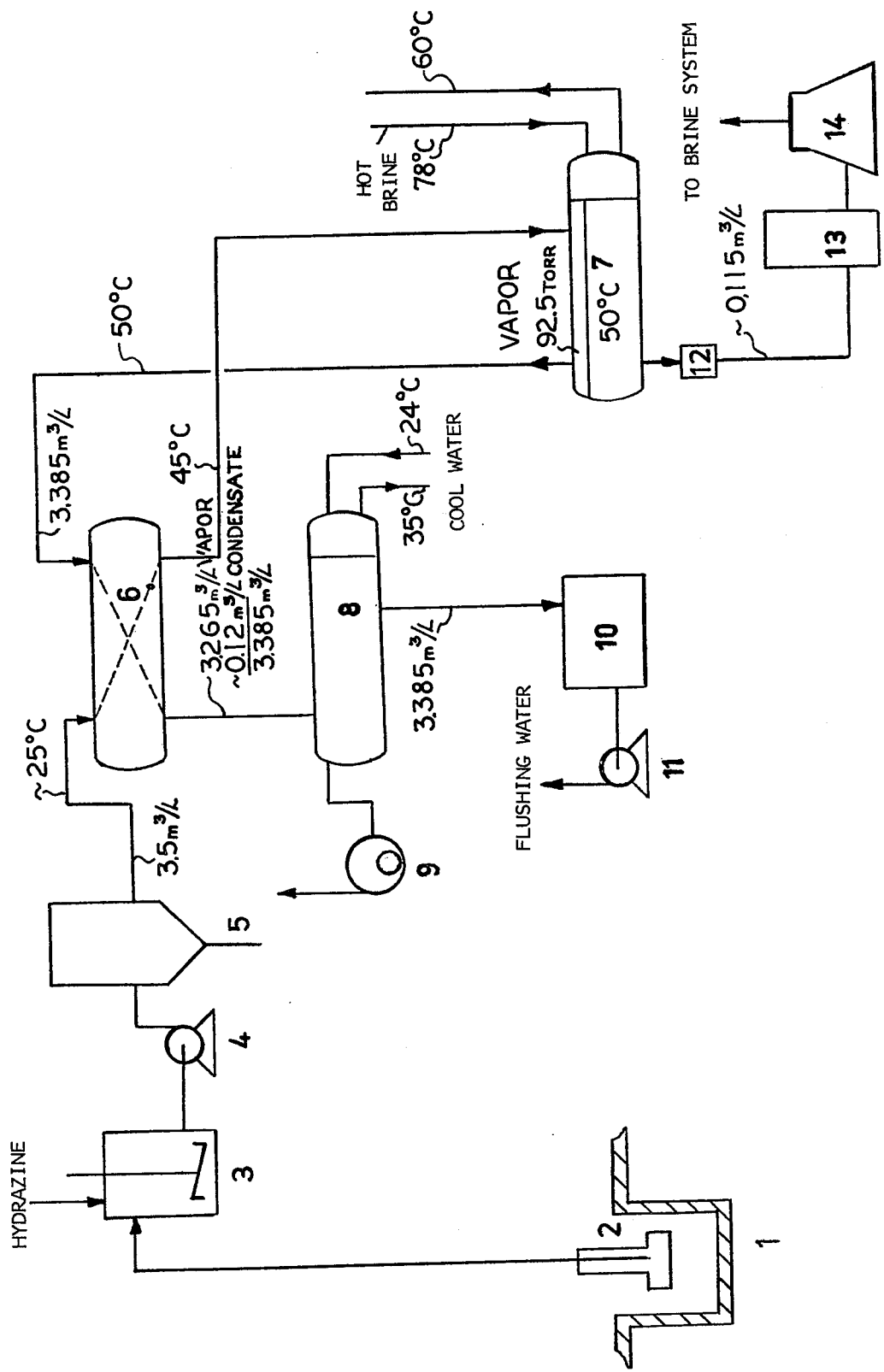

PROCESS OF AVOIDING MERCURY EMISSION FROM MERCURY-USING PLANTS

CROSS REFERENCE TO RELATED APPLICATION

This application constitutes a continuation-in-part of co-pending application, Ser. No. 176,866, filed Sept. 1, 1971 now abandoned, and entitled PROCESS FOR THE TREATMENT OF MERCURY-BEARING WASTE WATER.

BACKGROUND OF THE INVENTION

Th present invention relates to a process for the treatment of mercury-bearing waste water discharged from plants using mercury where mercury losses occur, particularly from mercury cathode electrolysis cells.

Mercury losses are inevitably encountered in plants using mercury where mercury is either processed or used as an auxiliary material. Any mercury collecting on the floor of process plant areas or residual mercury from vessels which are emptied for inspection or maintenance is entrained by flushing water. This flushing water, now called waste water, consequently contains mercury in varying concentrations, possibly in the order of magnitude of only some ppm, and is discharged to the sewer. It is imperative, indeed, to prevent any mercury emission because mercury in the form of an organic compound, for example methyl mercury, is injurious to the health of any living being. Any quantity of mercury, however small, may enrich in living beings, such as fish, game, and plants, and after conversion to organic mercury, may be injurious to the health of persons who consume such animal or vegetable matter.

In mercury cathode electrolysis cells, for example, the mercury serves an an auxiliary material. Mercury is the cathode in the electrolysis process and circulates through the cell, the amalgam decomposer, and the mercury pump. Mercury losses which are attributable to leakages on the pumps, the cells or the decomposers or to flushing operations during repair work in the electrolysis plant cannot be avoided. Mercury pumps are normally equipped with water seals for the shafts. Any leak on these seals will permit mercury-bearing seal water to leave the pump. Inadmissible accumulations of mercury on the cell room floor are removed by periodically hosing down. This way of cleaning the cell room floor is the simplest and cheapest method for removing mercury spills. The mercury entrained by the flushing water is collected in pits which also receive waste water from other sources which contains metallic mercury, mercury ions, and mercury complexes.

The route so far employed by the industries concerned has been to liberate this water, as far as economically reasonable, from mercury before discharging it to the sewer. Precipitation in the form of mercury sulphide, cementing, ion exchange, and the reduction with hydrazine are among the purification processes applied. For precipitating the mercury in the form of mercury sulphide, sodium sulphide or sodium hydrogensulphide NaHS is added to the mercury-bearing waste water while maintaining the pH value between 8 and 9; these chemicals cause the mercury to be precipitated as mercury sulphide which is then absorbed at the surface of the flocculated ferric hydroxide through the addition of ferric chloride. After sedimentation of the flocculent, the transparent solution is withdrawn and rejected to the sewer. According to a laboratory report by H. O. Bouveng and P. Ullmann of the "Swedish Water and Air Pollution Research Laboratory" the best results so far obtained is 0.1 ppm at a starting concentration of 3 ppm. The process is intermittent.

Cementing is based on the principle that mercury deposits on the surfaces of base metals because of the different electrochemical potentials. This method requires, however, the use of a cementing column which needs periodic regeneration. The same is true for ion exchangers as proposed in German Offenlegungsschrift No. 1,936,941. This method also requires regeneration in addition to further processing of the mercury-bearing regeneration liquid which also adds up to a high chemicals consumption rate.

For the reduction with hydrazine, the solution is mixed with that quantity of hydrazine which is necessary to reduce ionic mercury to the metallic form. The resulting emulsion is sent to a precoat filter where the mercury is retained; it has been found that the filtrate still contains 0.3 ppm mercury.

However, none of the known methods achieves complete elimination of the mercury from waste waters. Residual mercury content is invariably in the order of magnitude of some tenths ppm.

Although the degree of mercury extraction so far achieved eliminates any acute risks of poisoning, the possible enrichment, for example in fish, does constitute a latent hazard. Because of the capacity of present-day industrial plants and the big volume of effluent waste water discharged from these plants, even minute traces of mercury are hazardous to human health in view of the cumulative effect of enrichment. All endeavors that have so far been made were aimed at reducing the residual mercury content of waste water to some tenths ppm. Nevertheless, despite substantial expenditures, a quantity of 30 g/day of mercury is discharged at a residual concentration of 0.3 ppm and an effluent waste water flow rate of about 100 m$^3$/day.

A number of industrialized countries have issued stringent laws against mercury emissions into public waterways. An absolutely efficient process is needed to prevent future compulsory shutdown of industries that depend on mercury.

SUMMARY OF THE INVENTION

According to the invention, the problem of preventing the discharge of waste water from mercury using plants is solved by converting the pre-purified waste water to flushing water through vacuum distillation. To achieve economical performance, hot brine from the electrolysis plant is used to serve as a heat carrier for the vacuum distillation step.

The particular advantage achieved with the invention is that any emission of mercury by effluent waste water is avoided because the waste water is converted to flushing water for subsequent return to the process plant. The brine obtained from the blow-down is returned to the brine system of the plant.

Process industries are no longer menaced by the risk of compulsory shut-down. The processing of the residue from the vacuum distillation ensures a complete recovery of effluent-entrained mercury. No additional thermal energy is needed for vacuum distillation because hot brine is diverted from the alkaline chloride electrolysis plant, and its temperature is lowered to the level required for the electrolysis process. The cooling water required for condensing the vapours is no additional item because the transmission of heat by the brine means reducing the need for cooling the brine. The vacuum distillation unit may be fed with pre-purified waste water having a higher content of residual mercury. Previous consumption figures of chemicals are substantially reduced in this way. The flushing water is circulated in a loop.

BRIEF DESCRIPTION OF THE DRAWING

An example of application of the invention is illustrated in the attached drawing and is described in more detail below.

DESCRIPTION OF THE PREFERRED EMBODIMENT

The mercury-bearing waste water from mercury cathode electrolysis cells is collected in waste water pit 1. The waste water contains finely distributed suspended metallic mercury and dissolved Hg in the form of $Hg^{++}2$, $Hg^{++}$, $HgCl^-_3$, and $HgCl^{--}_4$, and is sent to a mixing tank 3 by an immersed pump 2. A conversion takes place after the addition of hydrazine, and the mixture is then pumped by a filter pump 4 to a precoat filter 5. After this pre-purification, the filtrate still contains about 1.05 g/hour of mercury, the filtrate flow rate being 3.5 m³/hour corresponding to a daily waste water quantity of 80 m³. In addition, the waste water which has a pH value of 12.5 also contains 0.22 ppm $Fe(OH)_3$ in the form of $Fe^{+++}$, about 50 ppm organic and silicon compounds and 7 g/l of NaCl. This water passes at a temperature of about 25°C and atmospheric pressure into a receiver (not shown on the drawing) of rubber-lined steel which has a volume of 0.4 m³. From this receiver, the water is sent by a centrifugal pump through a pre-heater 6 which serves for preheating the liquid from 25°C to 45°C to an evaporator 7. This evaporator is of the shell-and-tube type and is heated with brine which is at 78°C and has a concentration of 275 g/l of NaCl. The hot brine from mercury cathode electrolysis cells (not shown) is used as a heat carrier for the vacuum distillation step. The water in the evaporator 7 is heated to 50°C corresponding to a water vapour pressure of 92.5 Torr. The brine temperature drops to approximately 60°C. For vaporizing the water, a vacuum of 92.5 mm Hg is applied which corresponds to the water temperature of 50°C. This vacuum is produced by a motor-driven water seal pump of grey cast iron. The water vapour is withdrawn through preheater 6 where a small part of the vapour, or about one thirtieth of the vapour evolved in the evaporator 7, condenses while the waste water is preheated. This preheater 6 is of the shell-and-tube type; it has a heat-exchange area of 7 m² and is equipped with tubes of Ni-Cu10Fe. The balance of the water vapour passes, together with the condensate, to the condenser 8 which is also of the shell-and-tube type with tubes of NiCu10Fe and which is tied-in to vacuum pump 9. This shell-and-tube type condenser has a heat-exchange area of 135 m².

The cooling fluid, viz. cooling water of 24°C, passes across the tube side, and its temperature rises to 35°C. The water vapour condenses completely while the condensate passes through a barometric leg at a temperature of 50°C into receiver 10 from where it is fed back into a flushing water system by a centrifugal pump 11. This water is withdrawn for use from the flushing water system and returns as mercury-bearing waste water to the waste water pit referred to before. The flushing water may also be used for end box cleaning and for lean brine preparation. It will be seen that the positive steps in the conversion of pre-purified waste water are the distillation at 50°C with the aid of hot brine, i.e. at a temperature that results in low vapour pressure of the mercury and, therefore, in low contamination of the condensate by mercury, and using the condensate from such distillation as flushing water.

The evaporation step referred to above leads to a concentration of impurities in the waste water. In order to prevent crystallization of dissolved NaCl, which is the main constituent of the impurities, provision is made for an intermittent blow-down. A trap 12 which has a volume of 115 litres and which remains permanently filled with waste water is mounted below evaporator 7. As soon as the concentration of the waste water has risen from 7 - 10 g/l of NaCl to 210 - 300 g/l of NaCl, a portion of 115 litres which corresponds to one thirtieth of the total volume of waste water per hour must be drained. For this purpose, the trap is actuated through an adjustable timer, the time intervals being determined against density measurements. The drained brine passes to a receiver 13 which is sized to hold the daily volume of blow-down. This brine is sent through a separator 14 into the brine system. Separator 14 is provided to retain Hg, $Fe(OH)_3$, sand, and other solid particles which are also concentrated in the evaporator. The mercury-bearing dry sludge is sent, together with the sludge from the precoat filter, to a mercury distillation oven where the mercury is recovered.

The above example described the application of the invention in conjunction with mercury cathode electrolysis cells. It is evident that the invention permits of modifications in that, for example, the thermal energy for the waste water and the cooling fluid for the flushing water may be diverted from economic sources other than the plant itself.

What we claim is:

1. A process for containing mercury emission within mercury-using plants by partially purifying the mercury-contaminated water and using said water as the flushing water within the mercury-using plant so that no mercury-containing water is discharged outside of the plant, said process comprising the steps of:
   I. collecting mercury bearing waste water which includes $Hg^0$, $Hg^{++}$, $Hg^+$, $HgCl_3^-$, $HgCl_4^-$, $HgCl_4^{--}$, $Fe^{+++}$, NaCl and organic and silicon compounds from mercury cathode electrolysis cells in a waste water pit;
   II. pumping the mercury-bearing waste water to a mixing tank;
   III. adding hydrazine to the mixing tank which reduces some of the metallic ions to the metal form, thereby producing reduced mercury-bearing mercury waste water that mostly contains finely-divided metals, $Fe^{+++}$, NaCl, and organic and silicon compounds;
   IV. pumping the reduced mercury-bearing waste water to a pre-coat filter;
   V. separating in the pre-coat filter a sludge of metallic mercury and other solid material and having a filtrate which still contains some mercury, $Fe^{+++}$, NaCl, and other compounds;
   VI. conveying the filtrate to a receiver;
   VII. sending the filtrate by a centrifugal pump through a pre-heater, which is heated indirectly by the water vapor circulating in the preheater from Step XI, to achieve a heated filtrate;

VIII. conveying the heated filtrate to an evaporator which is equipped with means for blow-down operations to eliminate the excessive NaCl;

IX. heating the evaporator with hot brine from the brine process of the plant in order to heat further the heated filtrate;

X. applying a vacuum sufficient to vaporize the heated filtrate to a water vapor;

XI. withdrawing the water vapor through the preheater in Step VII wherein the water vapor heats the heated filtrate and a small amount of the water vapor condenses to form a condensate;

XII. conveying the water vapor and condensate from Step XI to a condenser which is connected to a vacuum pump;

XIII. employing cooling water in the condenser to condense the water vapor to a liquid water;

XIV. conveying the liquid water to a receiver from where it can be withdrawn for use as flushing water in the mercury-using plant;

XV. arranging to regularly blow-down the heated filtrate in the evaporation of Step IX by removing a portion of the total volume of heated filtrate per hour through a trap, said withdrawn filtrate termed a brine because the mechanism for timed withdrawal is related to the salt concentration;

XVI. conveying the brine to a receiver;

XVII. conveying the brine from the receiver to a separator wherein Hg, $Fe(OH)_3$, sand, and other solid particles termed sludge are retained and the brine freed of these ingredients is added to the brine system;

XVIII. combining the sludge from Step XVII and the sludge from Step V to form a combined sludge;

XIX. sending the combined sludge to a mercury distillation oven wherein mercury is recovered.

* * * * *